(12) United States Patent
O'Leary et al.

(10) Patent No.: US 8,255,134 B2
(45) Date of Patent: Aug. 28, 2012

(54) ADAPTIVE CRUISE CONTROL DOWNSHIFT REQUEST SYSTEMS FOR MANUAL TRANSMISSION VEHICLES

(75) Inventors: Patrick J. O'Leary, Clinton Township, MI (US); Barbara A. Shuler, Brighton, MI (US)

(73) Assignee: GM Global Technology Operations LLC

( * ) Notice: Subject to any disclaimer, the term of this patent is extended or adjusted under 35 U.S.C. 154(b) by 409 days.

(21) Appl. No.: 12/581,390

(22) Filed: Oct. 19, 2009

(65) Prior Publication Data
US 2011/0093174 A1    Apr. 21, 2011

(51) Int. Cl.
*B60W 30/16* (2012.01)
(52) U.S. Cl. ............. 701/64; 701/58; 701/96; 701/95; 701/97; 701/301; 180/169

(58) Field of Classification Search .............. 701/64, 701/58, 96, 93, 95, 94, 97, 98, 301; 180/167, 180/169
See application file for complete search history.

(56) References Cited

U.S. PATENT DOCUMENTS

| | | | | |
|---|---|---|---|---|
| 7,124,027 | B1 * | 10/2006 | Ernst et al. | 701/301 |
| 2007/0249464 | A1 * | 10/2007 | Stamm et al. | 477/78 |
| 2008/0306668 | A1 * | 12/2008 | Wang et al. | 701/93 |
| 2008/0306669 | A1 * | 12/2008 | Wang et al. | 701/93 |

* cited by examiner

*Primary Examiner* — Paul N Dickson
*Assistant Examiner* — Keith Frisby

(57) ABSTRACT

An adaptive cruise control system for a vehicle includes a deceleration module, a downshift trigger module, and a shift module. The deceleration module determines a deceleration rate based on a speed of at least one of the vehicle and an engine of the vehicle. The downshift trigger module generates a threshold signal based on the deceleration rate. The shift module generates a downshift signal when the speed is less than the threshold signal and while the vehicle is operating in a manual transmission mode.

19 Claims, 6 Drawing Sheets

ADAPTIVE CRUISE CONTROL DOWNSHIFT REQUEST SYSTEMS FOR MANUAL TRANSMISSION VEHICLES

FIELD

The present disclosure relates to adaptive cruise control systems for manual transmission vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Adaptive cruise control (ACC) systems are currently used in vehicles with an automatic transmission. An ACC system typically adjusts a speed of a host vehicle to maintain a set vehicle speed and adjusts the speed of the host vehicle to maintain a predetermined distance from a target vehicle. This prevents a collision between the host vehicle and the target vehicle.

An ACC system may operate based on information from an object detection sensor (e.g. a radar sensor) that detects objects forward of a host vehicle. The ACC system adjusts speed of the host vehicle based on location of a detected object relative to the host vehicle. The ACC system may temporarily reduce the vehicle speed of the host vehicle to maintain a predetermined distance between the host vehicle and the object. The speed of the host vehicle may be returned to a set vehicle speed when the object is at a distance that is greater than the predetermined distance. The ACC system may activate automatic braking when reducing the speed of the host vehicle.

SUMMARY

In one embodiment, an adaptive cruise control (ACC) system for a vehicle is provided. The ACC system includes a deceleration module, a downshift trigger module, and a shift module. The deceleration module determines a deceleration rate based on a speed of at least one of the vehicle and an engine of the vehicle. The downshift trigger module generates a threshold signal based on the deceleration rate. The shift module generates a downshift signal when the speed is less than the threshold signal and while the vehicle is operating in a manual transmission mode.

In other features, a method of operating an ACC system of a vehicle is provided. The method includes determining a deceleration rate based on a speed of at least one of the vehicle and an engine of the vehicle. A threshold signal is generated based on the deceleration rate. A downshift signal is generated when the speed is less than the threshold signal and while the vehicle is operating in a manual transmission mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
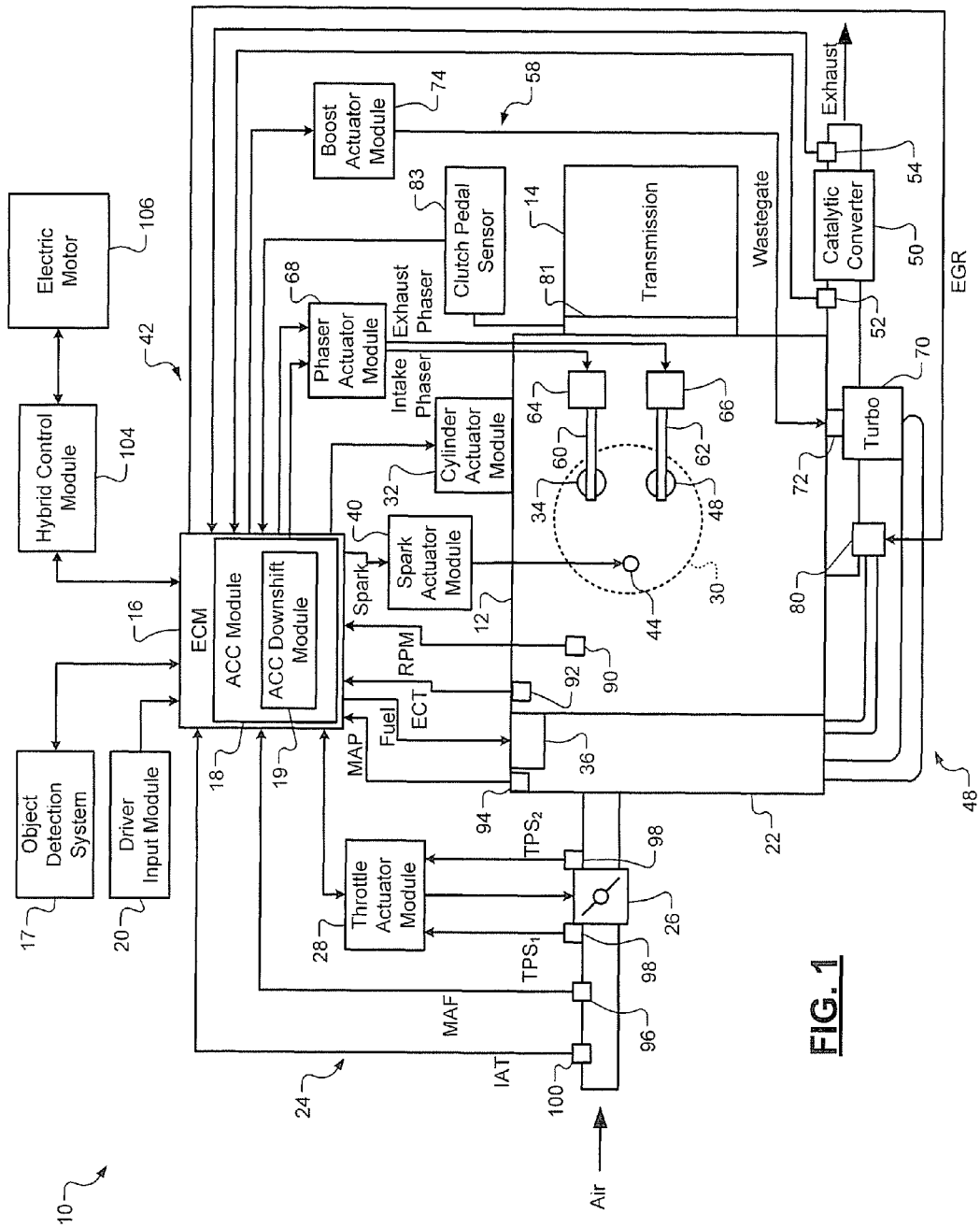
FIG. 1 is a functional block diagram of a portion of an engine control system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In addition, although the following embodiments are described primarily with respect to example internal combustion engines, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

In certain conditions, an engine of a vehicle that includes an adaptive cruise control (ACC) system and a manual transmission may stall. For example, during automatic braking, an ACC system may decelerate a host vehicle to maintain a predetermined distance from a target vehicle. The speed of an engine of the host vehicle and/or the speed of the host vehicle may decrease to a speed that is less than a predetermined speed. The predetermined speed may be associated with a downshift in a transmission of the host vehicle. If the host vehicle has an automatic transmission, the ACC system may automatically downshift the transmission. If the host vehicle has a manual transmission, the ACC system is incapable of performing a downshift and the engine may stall. The embodiments disclosed herein prevent engine stalls within a vehicle with an ACC system and a manual transmission or a transmission that operates in a manual transmission mode. The embodiments include techniques for determining when an indicator is activated to instruct a vehicle operator to manually perform a downshift.

In FIG. 1, a first portion 10 of an engine control system of a host vehicle is shown. The engine control system includes an engine 12, a transmission 14, an engine control module (ECM) 16, and an object detection system 17. The transmission 14 may be a manual transmission or a transmission that operates in a manual transmission mode. A manual transmission refers to a transmission that is shifted manually via shifter by a vehicle operator. A manual transmission does not refer to an automatic transmission, a semi-automatic transmission, or a manumatic transmission.

The ECM 16 includes an ACC module 18 with an ACC downshift module 19. While operating in an ACC mode, the ACC module 18 adjusts speed of the engine 12 and/or of the host vehicle to maintain a set speed and to maintain a predetermined distance from detected objects. The objects may be detected via the object detection system 17. The ACC downshift module 19 determines when to provide a downshift indication to a vehicle operator to downshift the transmission 14 while operating in the ACC mode.

The engine 12 combusts an air/fuel mixture to produce drive torque for a vehicle based on a driver input module 20. Air is drawn into an intake manifold 22 of a throttle control system 24 of the engine 12 through a throttle valve 26. The ECM 16 commands a throttle actuator module 28 to regulate opening of the throttle valve 26 to control the amount of air drawn into the intake manifold 22. Air from the intake manifold 22 is drawn into cylinders of the engine 12. While the engine 12 may include multiple cylinders, for illustration purposes, a single representative cylinder 30 is shown. The ECM 16 via the variable displacement module may instruct a cylinder actuator module 32 to selectively deactivate some of the cylinders to improve fuel economy.

Air from the intake manifold 22 is drawn into the cylinder 30 through an intake valve 34. The ECM 16 controls the amount of fuel injected by a fuel injection system 36. The fuel injection system 36 may inject fuel into the intake manifold 22 at a central location or may inject fuel into the intake manifold 22 at multiple locations, such as near the intake valve of each of the cylinders. Alternatively, the fuel injection system 36 may inject fuel directly into the cylinder 30.

The injected fuel mixes with the air and creates the air/fuel mixture in the cylinder 30. A piston (not shown) within the cylinder 30 compresses the air/fuel mixture. Based upon a signal from the ECM 16, a spark actuator module 40 of an ignition system 42 energizes a spark plug 44 in the cylinder 30, which ignites the air/fuel mixture. The spark actuator module 40 may be referred to as an ignition control module, as in FIG. 2. Spark timing may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 48. The byproducts of combustion are exhausted from the vehicle via an exhaust system 48.

The exhaust system 48 includes a catalytic converter 50, a pre-converter (primary) $O_2$ sensor 52, and a post-converter (secondary) $O_2$ sensor 54. The $O_2$ sensors 52, 54 detection oxygen levels upstream and downstream of the catalytic converter 50. The $O_2$ sensors 52, 54 generate respective primary and secondary $O_2$ signals that may be fedback to the ECM 16 for closed loop control of air/fuel ratio(s).

The intake and exhaust valves 34, 48 may be controlled via a valve control system 58, which may include intake and exhaust camshafts 60, 62. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. In an alternative embodiment, positioning of the intake and exhaust valves of each cylinder may be individually and independently controlled via dedicated valve actuators (not shown).

The cylinder actuator module 32 may deactivate cylinders by halting provision of fuel and/or spark and by disabling respective exhaust and/or intake valves.

The time at which the intake valve 34 is opened may be varied with respect to piston TDC by an intake cam phaser 64. The time at which the exhaust valve 48 is opened may be varied with respect to piston TDC by an exhaust cam phaser 66. A phaser actuator module 68 controls the phasers 64, 66 based on signals from the ECM 16.

The engine control system may include a boost device that provides pressurized air to the intake manifold 22. For example, FIG. 1 depicts a turbocharger 70. The turbocharger 70 is powered by exhaust gases flowing through the exhaust system 48, and provides a compressed air charge to the intake manifold 22. A wastegate 72 may allow exhaust gas to bypass the turbocharger 70, thereby reducing the turbocharger's output (or boost). The ECM 16 controls the turbocharger 70 via a boost actuator module 74. The boost actuator module 74 may modulate the boost of the turbocharger 70 by controlling the position of the wastegate 72. Alternate engine systems may include a supercharger that provides compressed air to the intake manifold 22 and is driven by the crankshaft.

The engine control system may include an exhaust gas recirculation (EGR) valve 80, which selectively redirects exhaust gas back to the intake manifold 22. In various implementations, the EGR valve 80 may be located after the turbocharger 70. The engine control system may measure the speed of the crankshaft in revolutions per minute (RPM) using an RPM sensor 90. The temperature of the engine coolant may be measured using an engine coolant temperature (ECT) sensor 92. The ECT sensor 92 may be located within the engine 12 or at other locations where the coolant is circulated, such as a radiator (not shown).

The pressure within the intake manifold 22 may be measured using a manifold absolute pressure (MAP) sensor 94. In various implementations, engine vacuum may be measured, where engine vacuum is the difference between ambient air pressure and the pressure within the intake manifold 22. The mass of air flowing into the intake manifold 22 may be measured using a mass air flow (MAF) sensor 96. In various implementations, the MAF sensor 96 may be located in a housing with the throttle valve 26.

The throttle actuator module 28 may monitor the position of the throttle valve 26 using one or more throttle position sensors (TPS) 98. The ambient temperature of air being drawn into the engine control system may be measured using an intake air temperature (IAT) sensor 100. The ECM 16 may use signals from the sensors to make control decisions for the engine control system.

The ECM 16 may communicate with a hybrid control module 104 to coordinate operation of the engine 12 and an electric motor 106. The electric motor 106 may also function as a generator, and may be used to produce electrical energy for use by vehicle electrical systems and/or for storage in a battery. In various implementations, the ECM 16 and the hybrid control module 104 may be integrated into one or more modules.

To abstractly refer to the various control mechanisms of the engine 12, each system that varies an engine parameter may be referred to as an actuator. For example, the throttle actuator module 28 can change the blade position, and therefore the opening area, of the throttle valve 26. The throttle actuator module 28 can therefore be referred to as an actuator, and the throttle opening area can be referred to as an actuator position.

Similarly, the spark actuator module 40 can be referred to as an actuator, while the corresponding actuator position is amount of spark advance. Other actuators include the boost actuator module 74, the EGR valve 80, the phaser actuator module 68, the fuel injection system 36, and the cylinder actuator module 32. The term actuator position with respect to these actuators may correspond to boost pressure, EGR valve opening, intake and exhaust cam phaser angles, air/fuel ratio, and number of cylinders activated, respectively.

The transmission 14 may be shifted manually via a clutch assembly 81. A clutch pedal sensor 83 may be used to detect position of a clutch pedal (not shown). When the transmission 14 is an automatic transmission that has a manual transmission mode, a clutch assembly and/or a clutch pedal may not be included. The vehicle operator shifts gears of the transmission 14 by pressing the clutch pedal and changing position of a shifter (not shown) of the clutch assembly.

Figure 2:
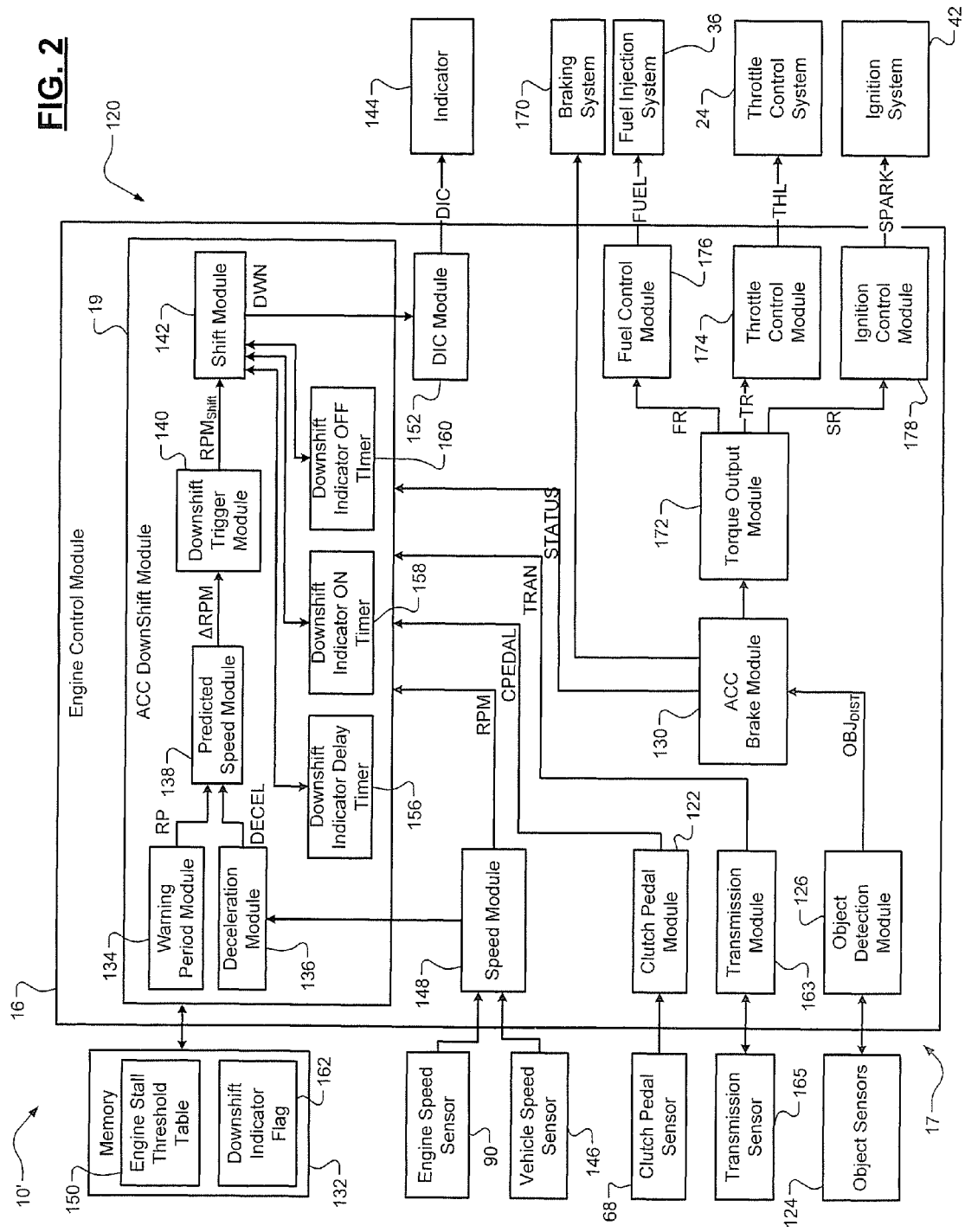
FIG. 2 is a functional block diagram of another portion of the engine control system of FIG. 1 including an adaptive cruise control system.

Referring now also to FIG. 2, a second portion 10' of the engine control system is shown. The second portion 10' includes the object detection system 17 and an ACC system 120. The ACC system 120 may operate based on inputs from a vehicle operator and detection of objects by the object detection system 17. Example vehicle operator inputs are a cruise control set speed input, an accelerator pedal input and a clutch pedal input. The clutch pedal input may be generated via a clutch pedal module 122 and based on a clutch pedal signal received from the clutch pedal sensor 83.

The object detection system 17 may include object sensors 124 and an object detection module 126. The object sensors 124 may include, for example, radar sensors, image sensors, cameras, charge-coupled devices, etc. The object sensors 124 generate object detection signals $OBJ_{DET}$. The object detection module 126 evaluates the object detection signals $OBJ_{DET}$ and determines whether there is an object in close proximity of the host vehicle. The object detection module 126 may generate an object distance signal $OBJ_{DIST}$ indicating distance of a detected object.

The ACC system 120 includes the ACC downshift module 19, an ACC brake module 130 and memory 132. The modules 19, 130 may be part of the ACC module 18. The ACC downshift module 19 may include a warning period module 134, a deceleration module 136, a predicted RPM module 138, a downshift trigger module 140, and a shift module 142.

The ACC downshift module 19 determines when a downshift indication is to be provided to a vehicle operator via a downshift indicator 144. The downshift indication is provided based on a downshift trigger speed or speed at which the indication is provided. The trigger speed may be provided for a warning period before the speed of the engine 12 and/or the vehicle decreases to a speed that is less than a corresponding engine stall speed or vehicle stall speed (corresponds to an engine stall speed). The engine speed and the vehicle speed may be provided by the engine speed sensor 90 and a vehicle speed sensor 146. A speed module 148 may receive speed signals from the sensors 90, 146 and determine the engine speed and/or vehicle speed, which are used by the ACC downshift module 19.

Figure 3:
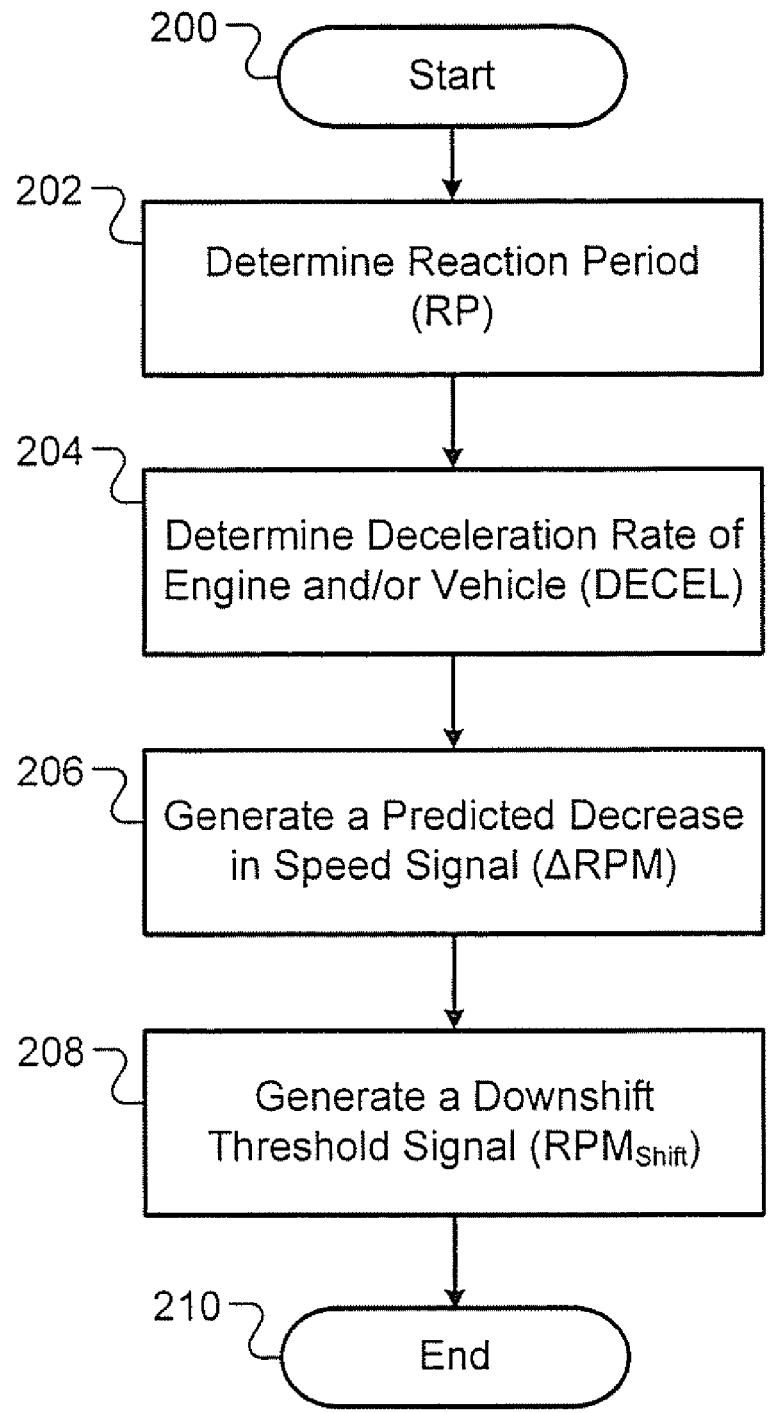
FIG. 3 is a flow diagram illustrating a method of calculating a downshift trigger speed.

Referring now to FIG. 3, a method of calculating a downshift trigger speed is shown. The method may begin at step 200. Although the following steps are primarily described with respect to the embodiments of FIGS. 1 and 2, the steps may be modified for other embodiments of the present disclosure.

In step 202, the warning period module 134 determines a reaction period RP, which may be referred to as a warning period. The reaction period RP may be equal to the sum of an operator recognition period RGP, a downshift period DP and a margin M, as provided in equation 1.

$$RP = RGP + DP + M \quad (1)$$

The recognition period RGP may refer to an amount of time or an average amount of time for a vehicle operator to recognize that the downshift indicator 144 is active and to respond by beginning to downshift the transmission 14. The downshift period DP may refer to an amount of time or an average amount of time for a vehicle operator to perform a downshift including the pushing or pressing down on the clutch pedal and the positioning of a shifter of the transmission. The margin M refers to a tolerance or additional amount of time allotted for performing a downshift before a stall threshold is exceeded. The warning period may be determined independent of (i.e., not based on): the speed of the engine 12 and/or the vehicle; an engaged gear of the transmission 14; a deceleration rate of the engine 12; and a deceleration rate of the vehicle.

In step 204, the deceleration module 136 determines the deceleration rate of the engine 12 and/or the vehicle and generates a deceleration signal DECEL. The speed of the engine 12 and/or of the vehicle may be determined based on a speed signal RPM from the speed module 148. The speed module 148 may generate the speed signal RPM based on signals from the engine speed sensor 90 and the vehicle speed sensor 146. A derivative of the RPM signal over time may be performed to generate the deceleration signal DECEL.

In step 206, the predicted speed module 138 generates a predicted decrease in speed signal ΔRPM based on the deceleration signal DECEL. The predicted decrease in speed signal ΔRPM may refer to an amount of decrease in speed of the engine 12 or of the vehicle during the reaction period, depending on whether engine speed or vehicle speed is used. The predicted decrease in speed signal ΔRPM may be equal to the deceleration signal DECEL multiplied by the reaction period RP, as shown in equation 2.

$$\Delta RPM = RP \cdot DECEL \quad (2)$$

In step 208, the downshift trigger module 140 generates a downshift threshold signal $RPM_{Shift}$. The downshift threshold signal $RPM_{Shift}$ indicates the speed at which a downshift indication is generated. The downshift threshold signal $RPM_{Shift}$ may be determined based on the predicted decrease in speed signal ΔRPM and an engine stall threshold EST. The downshift threshold signal $RPM_{Shift}$ may be determined as shown by equation 3.

$$RPM_{Shift} = \Delta RPM + EST \quad (3)$$

An engine stall threshold table 150 may be stored in the memory 132. The engine stall threshold table 150 may include engine stall thresholds that are based on various parameters, such as engine operating time, vehicle mileage, engine temperature, coolant temperature, oil temperature, altitude, system voltage (e.g., battery voltage), idle speed of the engine 12, engaged transmission gear (each gear has a corresponding gear ratio), type and/or configuration of the engine 12, type and/or model of the vehicle, etc. In one embodiment, a different engine stall threshold is provided for each gear of the transmission 14, except for first gear. This provides accurate engine stall thresholds and prevents false downshift indications and/or downshift indications that are early (providing too much downshift time) or late (not providing enough downshift time). The engine stall thresholds may be fixed values or may be adjusted based on the stated parameters.

The downshift indication may be provided as a downshift signal DWN. The downshift signal DWN may be generated by the shift module 142 and/or by a driver information center (DIC) module 152. The DIC module 152 may generate a DIC message that is provided to the downshift indicator 144. The downshift indicator 144 may be, for example, an icon on a display, an indicator light on a dashboard, a visual and/or audible indicator, etc.

The shift module 142 may generate the downshift signal DWN based on a downshift indictor delay timer 156, a downshift indicator ON timer 158, a downshift indicator OFF timer 160, and a downshift indicator flag 162. The downshift indictor delay timer 156 is used to determine whether the speed signal RPM is less than the downshift trigger speed $RPM_{Shift}$ for a first predetermined period. This prevents activation of the downshift indicator 144 due to, for example, noise. The downshift indicator ON timer 158 is used to maintain the downshift indicator 144 when activated in an ON state for a second predetermined period. This assures that the downshift indictor 144 is ON for an extended period, such that the vehicle operator notices and responds.

The downshift indicator OFF timer 160 is used to maintain the downshift indicator 144 in an OFF state for a third predetermined period after a first activation of the downshift indicator 144. This prevents the downshift indicator 144 from being cycled ON and OFF repetitively in a short period. The downshift indicator flag 162 may be stored in the memory 132 and indicates when the downshift indicator 144 is OFF for the predetermined period.

The shift module 142 may also generate the downshift signal DWN based on a clutch pedal signal CPEDAL, a transmission signal TRAN, and an ACC signal STATUS. The transmission signal may be generated by a transmission module 163 and may indicate engaged gear of the transmission 14 and the operating mode of the transmission 14. The transmission module may receive gear and/or transmission status information via a transmission sensor 165. The operating modes of the transmission 14 may include an automatic mode and a manual mode. The ACC signal STATUS may indicate whether ACC is enabled and whether ACC braking is being performed. ACC braking may include engine braking, the applying of brakes (e.g., wheel brakes) via a braking system 170, the applying of reverse torque via the electric motor, etc. The method may end at 210.

The ACC brake module 130 may signal a torque output control module 172 and/or control operation of the throttle control system 24, the fuel injection system 36, the ignition system 42, and the braking system 170 based on the object distance signal $OBJ_{DIST}$. The operation of the throttle control system 24, the fuel injection system 36, the ignition system 42, and a braking system 170 may be controlled respectively via a throttle control module 174, a fuel control module 176 and an ignition control module 178.

Figure 4A:
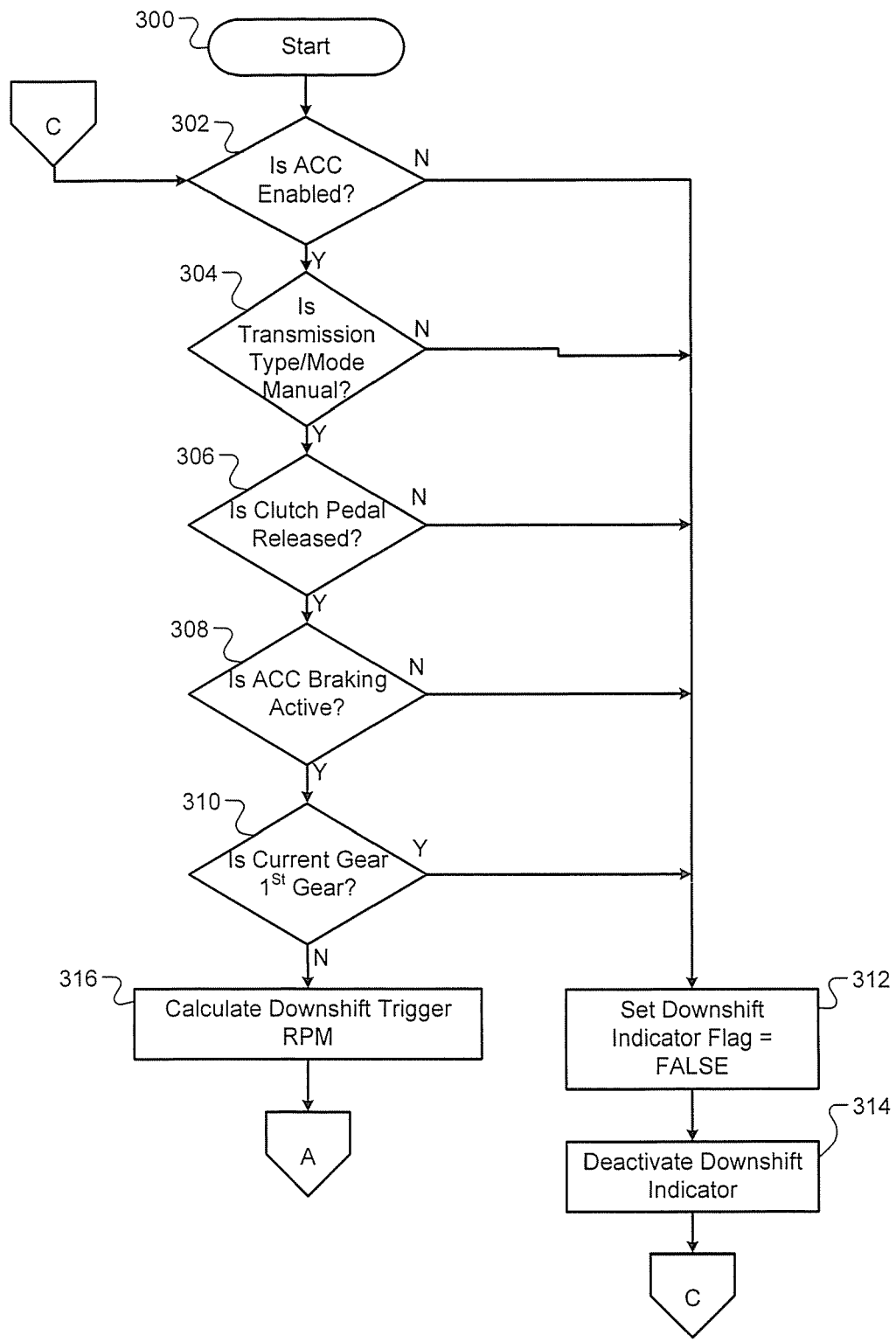
FIG. 4A is a logic flow diagram illustrating a method of operating an engine control system including a method of operating an adaptive cruise control system.
Figure 4B:
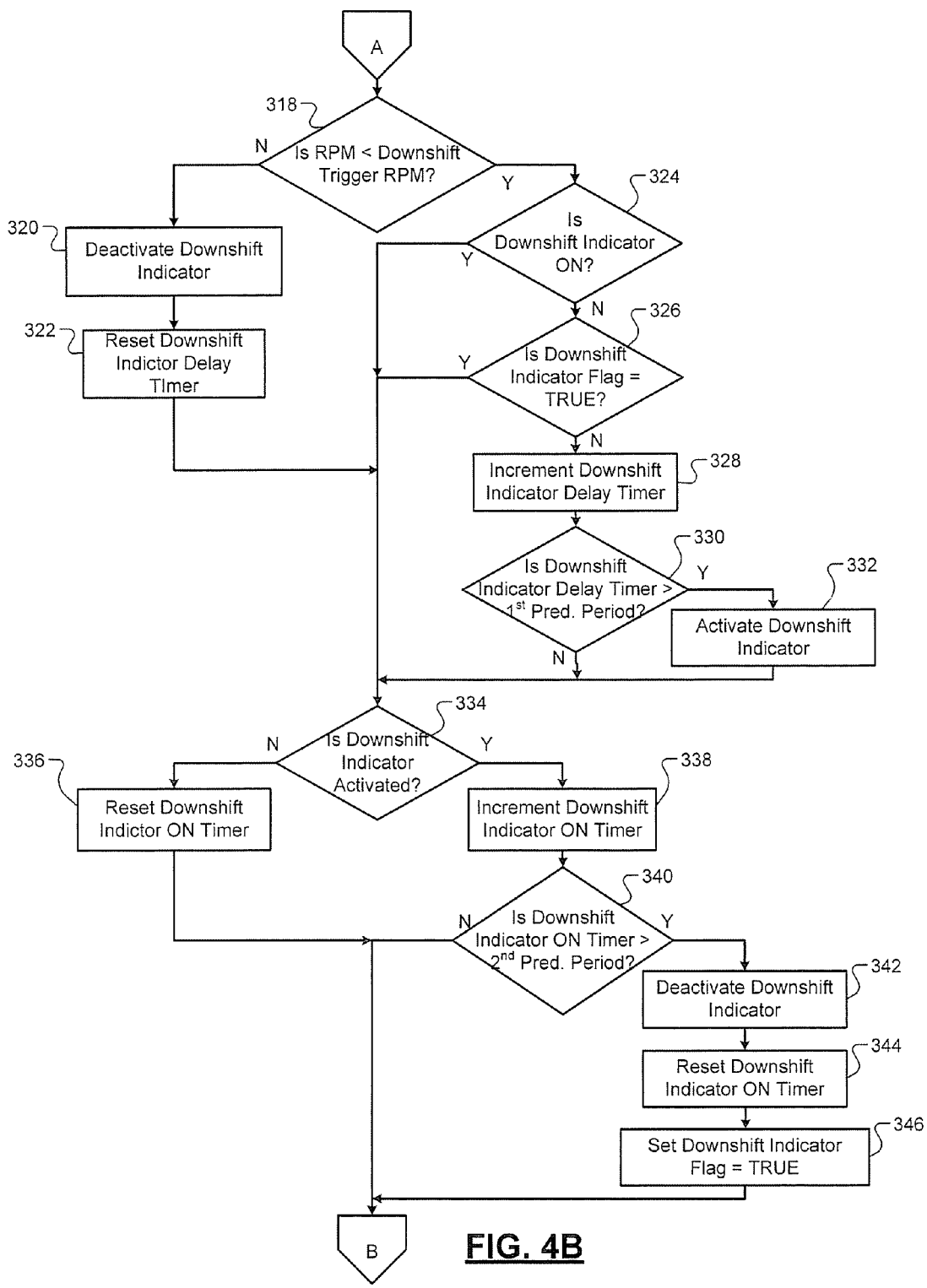
FIGS. 4B and 4C are a continuation of the logic flow diagram of FIG. 4A.
Figure 4C:
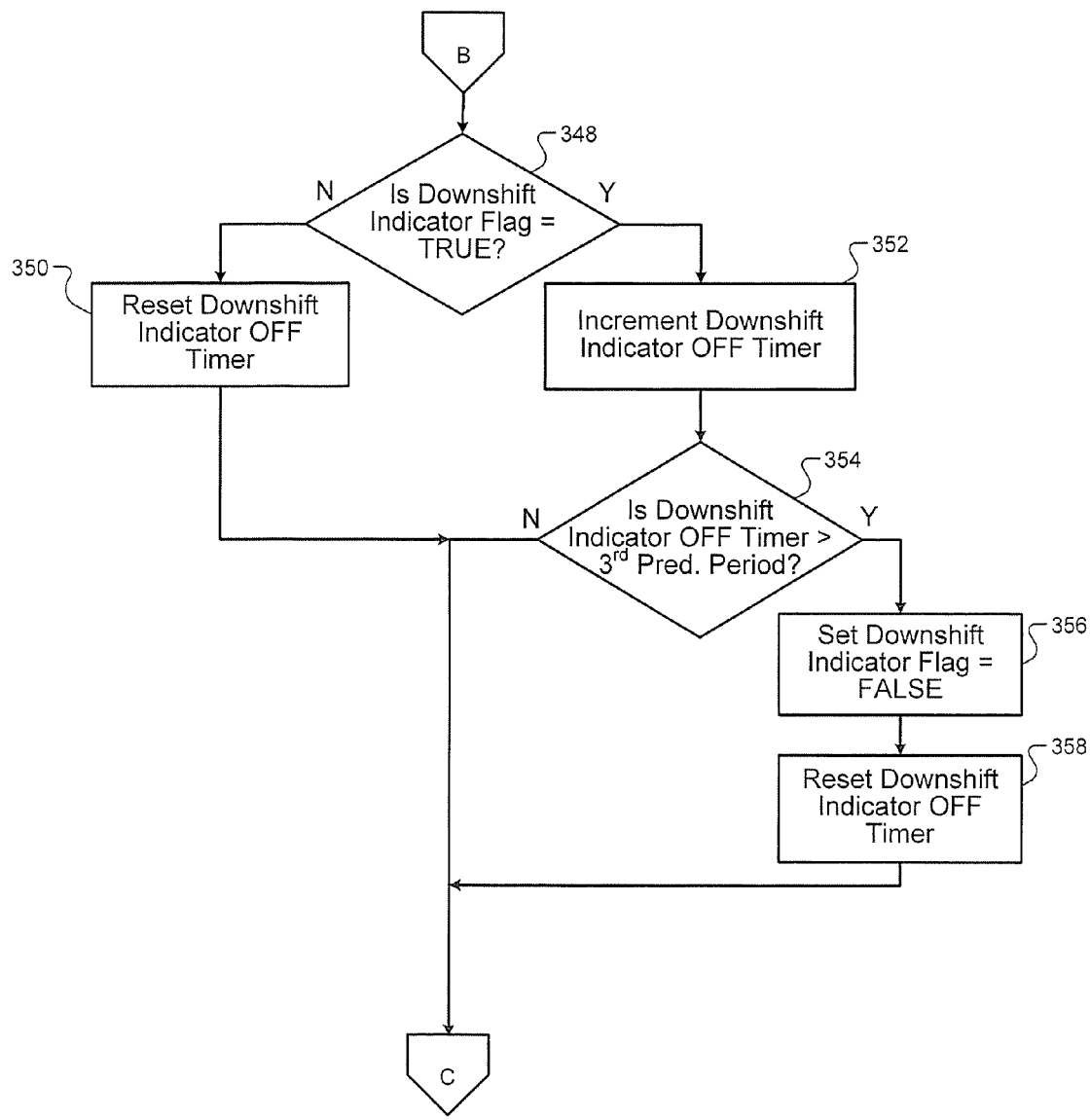

Referring now also to FIGS. 4A-C, a logic flow diagram illustrating a method of operating an engine control system including a method of operating the ACC system 120 is shown. Although the following steps are primarily described with respect to the embodiments of FIGS. 1 and 2, the steps may be easily modified to apply to other embodiments of the present invention. The steps of the methods of FIGS. 4A-C may be iteratively performed by the ACC downshift module. The method may begin at step 300.

In step 302, the shift module 142 determines whether ACC is enabled. ACC may be enabled when cruise control is active and the ACC system 120 is maintaining the vehicle at a set speed. Step 304 is performed when ACC is enabled, otherwise step 312 is performed.

In step 304, the shift module 142 determines whether the transmission 14 is a manual transmission and/or whether the transmission 14 is operating in a manual transmission mode. A manual transmission operates in a manual transmission mode. An automatic transmission may operate in an automatic mode or a manual transmission mode. The manual transmission mode allows a vehicle operator to manually select a gear of the transmission. Step 306 is performed when the transmission 14 is in the manual transmission mode, otherwise step 312 is performed.

In step 306, the shift module 142 determines whether the clutch pedal is released. Step 308 is performed when the clutch pedal is released, otherwise step 312 is performed.

In step 308, the shift module 142 determines whether ACC braking is performed. The ACC system 120 may signal the ECM 16 to control the engine 12 to produce a minimum output torque or idle torque when ACC braking is performed. This prevents the engine 12 and/or corresponding powertrain from producing torque that counteracts the braking torque provided by the ACC system 120. The minimum output torque allows for the ACC braking module 130 to control the deceleration rate of the engine 12 and/or vehicle. Step 310 is performed when ACC braking is performed, otherwise step 312 is performed.

In step 310, the shift module 142 determines whether the transmission 14 is in first gear (e.g., a transmission may have 6 gears, the first gear refers to the lowest gear or the first of the 6 gears). Step 316 is performed when the transmission 14 is not in the first gear, otherwise step 312 is performed.

In step 312, the downshift indicator flag 162 is set equal to FALSE. In step 314, the downshift indicator 144 is deactivated. If the downshift indicator 144 is OFF, the downshift indicator 144 is maintained in an OFF state. If the downshift indicator 144 is ON, the downshift indicator 144 is set in an OFF state. The ACC downshift module 19 returns to Step 302 after step 314.

In step 316, the ACC downshift module 19 calculates a downshift trigger speed. This may be calculated continuously and as described above with respect to the embodiment of FIG. 3. Step 318 is performed after step 316.

In step 318, the ACC downshift module 19 and/or the shift module 142 determines whether the speed of the engine 12 or of the vehicle is less than the downshift trigger speed. Steps 320-322 may be performed when the speed signal RPM is greater than or equal to the downshift trigger speed, otherwise steps 324-332 are performed. The ACC downshift module 19 and/or the shift module 142 may also determine the engaged gear of the transmission 14 when the vehicle speed is used. The ACC downshift module 19 may proceed to either steps 320-322 or steps 324-332 based on the engaged gear. Engine speed may be used without determining the engaged gear, since engine speed deceleration is directly related to gear ratio of an engaged gear for a manual transmission operating with a clutch pedal in a released state.

In step 320, the downshift indicator 144 is deactivated. The downshift indicator 144 is deactivated based on the downshift signal DWN, which may be deactivated or in an OFF (e.g., LOW) state. In step 322, the downshift indicator delay timer 156 is reset.

In step 324, the ACC downshift module 19 monitors the downshift indicator 144 and/or the downshift signal and proceeds to step 326 when the downshift indicator 144 is deactivated, otherwise the ACC downshift module 19 proceeds to step 334. In step 326, the ACC downshift module 19 monitors the downshift indicator flag and proceeds to step 328 when the downshift indictor flag is not set equal to TRUE, otherwise the ACC downshift module 19 proceeds to step 334. In step 328, the downshift indicator delay timer 156 is incremented.

In step 330, the ACC downshift module 19 proceeds to step 332 when the downshift indicator delay timer 156 is greater than the first predetermined period, otherwise the ACC downshift module 19 proceeds to step 334. In step 332, the downshift indicator 144 is activated. The downshift signal DWN may be activated or in an ON (e.g., HIGH) state to activate the downshift indicator 144.

In step 334, the ACC downshift module 19 proceeds to step 336 when the downshift indicator 144 is not activated, otherwise the ACC downshift module 19 proceeds to step 338. In step 336, the downshift indicator ON timer 158 is reset. The ACC downshift module 19 proceeds to step 348 after step 336. In step 338, the downshift indicator ON timer 158 is incremented.

In step 340, the downshift indicator ON timer 158 is compared with the second predetermined period. Step 348 is performed when the downshift indicator ON timer 158 is less than or equal to the second predetermined period, otherwise step 342 is performed.

In step 342, the downshift indicator 144 is deactivated. The downshift signal may be deactivated or in an OFF state. In step 344, the downshift indicator ON timer 158 is reset. In step 346, the downshift indicator flag 162 is set equal to TRUE.

In step 348, the ACC downshift module 19 proceeds to step 352 when the downshift indicator flag 162 is equal to TRUE, otherwise the ACC downshift module 19 proceeds to step 350. In step 350, the downshift indicator OFF timer 160 is reset. In step 352, the downshift indicator OFF timer 160 is incremented.

In step 354, the downshift indicator OFF timer 160 is compared with the third predetermined period. The ACC downshift module 19 proceeds to step 356 when the downshift indicator OFF timer 160 is greater than the third predetermined period, otherwise the ACC downshift module 19 returns to step 302.

In step 356, the downshift indicator flag 162 is set equal to FALSE. In step 358, the downshift indicator OFF timer 160 is reset. The ACC downshift module 19 returns to step 302 after step 358.

The above-described steps are meant to be illustrative examples; the steps may be performed sequentially, synchronously, simultaneously, continuously, during overlapping time periods or in a different order depending upon the application.

As an alternative to the above-described method, a downshift message (i.e. downshift indication) may be triggered based on the speed of the engine 12 and/or an amount of time that the speed of the engine 12 is less than an engine speed threshold. The engine speed threshold may be adjusted based on speed of the engine 12. The engine speed threshold is adjusted to allow sufficient time during events of different engine deceleration rates to allow a vehicle operator to respond to the downshift message.

The above-described embodiments provide a vehicle operator sufficient time to downshift a transmission. This prevents an engine stall when operating in an ACC mode. A consistent warning period is provided that allows for the vehicle operator to downshift while preventing downshift indications that are erratic and/or improperly timed.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An adaptive cruise control system for a vehicle comprising:
 a deceleration module that determines a deceleration rate based on a speed of at least one of the vehicle and an engine of the vehicle;
 a downshift trigger module that generates a threshold signal based on the deceleration rate;
 a shift module that generates a downshift signal when the speed is less than the threshold signal and while the vehicle is operating in a manual transmission mode; and
 a warning period module that determines a reaction period, wherein the threshold signal is generated based on the reaction period.

2. The adaptive cruise control system of claim 1, further comprising an information center module that signals a vehicle operator based on the downshift signal.

3. The adaptive cruise control system of claim 1, wherein the warning period module determines the reaction period based on a recognition period, a downshift period and a margin.

4. The adaptive cruise control system of claim 1, further comprising a predicted speed module that determines a predicted decrease in the speed based on the deceleration rate and the reaction period,
 wherein the downshift trigger module generates the threshold signal based on the predicted decrease in the speed.

5. The adaptive cruise control system of claim 4, wherein the downshift trigger module generates the threshold signal based on an engine stall threshold.

6. The adaptive cruise control system of claim 1, wherein the downshift trigger module generates the threshold signal based on an engine stall threshold, and
 wherein the downshift trigger module determines the engine stall threshold based on at least one of an altitude and a system voltage.

7. The adaptive cruise control system of claim 1, wherein the shift module generates the downshift signal when adaptive cruise control is enabled, and
 wherein the shift module does not generate the downshift signal when adaptive cruise control is disabled.

8. The adaptive cruise control system of claim 1, wherein the shift module generates the downshift signal when the vehicle is operating in the manual transmission mode, and
 wherein the shift module does not generate the downshift signal when the vehicle is not operating in the manual transmission mode.

9. The adaptive cruise control system of claim 1, wherein the shift module generates the downshift signal when a clutch pedal is released, and
 wherein the shift module does not generate the downshift signal when the clutch pedal is not released.

10. The adaptive cruise control system of claim 1, wherein the shift module generates the downshift signal when adaptive cruise control braking is performed, and
 wherein the shift module does not generate the downshift signal when adaptive cruise control braking is not performed.

11. The adaptive cruise control system of claim 1, wherein the shift module generates the downshift signal when a transmission of the vehicle is in a gear other than a first gear.

12. The adaptive cruise control system of claim 1, wherein the shift module generates the downshift signal when the speed is less than the threshold signal for a predetermined period.

13. The adaptive cruise control system of claim 1, wherein the shift module generates the downshift signal for a predetermined period, and wherein the shift module ceases generation of the downshift signal after the predetermined period.

14. The adaptive cruise control system of claim 1, wherein the shift module ceases generation of the downshift signal at an end time, and
> wherein the shift module prevents generation of the downshift signal until a predetermined period after the end time.

15. The adaptive cruise control system of claim 1, wherein the shift module generates the downshift signal for the warning period before the speed exceeds a stall threshold, and
> wherein the warning period is determined independent of the speed, an engaged gear of a transmission of the vehicle, a deceleration rate of the engine and a deceleration rate of the vehicle.

16. The adaptive cruise control system of claim 1, wherein the downshift trigger module generates the threshold signal based on a positive deceleration rate, and
> wherein a transmission of the vehicle is a manual transmission.

17. An adaptive cruise control system for a vehicle comprising:
> a deceleration module that determines a deceleration rate based on a speed of at least one of the vehicle and an engine of the vehicle;
> a downshift trigger module that generates a threshold signal based on the deceleration rate; and
> a shift module that generates a downshift signal when the speed is less than the threshold signal and while the vehicle is operating in a manual transmission mode,
> wherein the downshift trigger module generates the threshold signal based on an engine stall threshold, and
> wherein the downshift trigger module determines the engine stall threshold based on at least one of mileage of the vehicle, a temperature of the engine, an altitude, a system voltage, and an idle speed.

18. A method of operating an adaptive cruise control system of a vehicle comprising:
> determining a deceleration rate based on a speed of at least one of the vehicle and an engine of the vehicle;
> generating a threshold signal based on the deceleration rate;
> generating a downshift signal when the speed is less than the threshold signal and while the vehicle is operating in a manual transmission mode; and
> determining a reaction period based on a recognition period, a downshift period and a margin,
> wherein the threshold signal is generated based on the reaction period.

19. The method of claim 18, wherein:
the threshold signal is generated based on an engine stall threshold; and
the downshift signal is generated when: adaptive cruise control is enabled; the vehicle is operating in the manual transmission mode; a clutch pedal is released; adaptive cruise control braking is performed; and a transmission of the vehicle is in a gear other than a first gear.

* * * * *